(12) United States Patent
Hung

(10) Patent No.: US 9,125,056 B2
(45) Date of Patent: *Sep. 1, 2015

(54) SYSTEM AND METHOD FOR VALIDATING A USER OF AN ACCOUNT FOR A WIRELESS DEVICE

(71) Applicant: BlackBerry Limited, Waterloo (CA)

(72) Inventor: Michael Hin Kai Hung, Toronto (CA)

(73) Assignee: BLACKBERRY LIMITED, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/172,382

(22) Filed: Mar. 17, 2014

(65) Prior Publication Data

US 2014/0250504 A1    Sep. 4, 2014

Related U.S. Application Data

(63) Continuation of application No. 13/152,662, filed on Jun. 3, 2011, now Pat. No. 8,683,550, which is a continuation of application No. 11/344,176, filed on Feb. 1, 2006, now Pat. No. 7,975,287.

(51) Int. Cl.
*H04L 29/06*    (2006.01)
*H04W 12/06*    (2009.01)
(Continued)

(52) U.S. Cl.
CPC .............. *H04W 12/06* (2013.01); *G06F 21/30* (2013.01); *G06F 21/31* (2013.01); *G06F 21/335* (2013.01);
(Continued)

(58) Field of Classification Search
CPC ... G06F 21/03; G06F 21/04; G06F 2211/003; H04L 9/32; H04L 63/08; H04L 2463/082
USPC ......... 726/1–15, 21; 713/155–159, 164–186; 709/217–229
See application file for complete search history.

(56) References Cited

U.S. PATENT DOCUMENTS

| 5,768,373 A | 6/1998 | Lohstroh et al. |
| 6,785,901 B1 | 8/2004 | Horiwitz |

(Continued)

FOREIGN PATENT DOCUMENTS

| WO | WO 01/17310 A1 | 3/2001 |
| WO | WO 2005/002131 A1 | 1/2005 |

OTHER PUBLICATIONS

Al-Muhtadi, Jalal, Dennis Mickunas, and Roy Campbell. "A lightweight reconfigurable security mechanism for 3G/4G mobile devices." Wireless Communications, IEEE 9.2 (2002): 60-65.*

(Continued)

*Primary Examiner* — Madhuri Herzog
(74) *Attorney, Agent, or Firm* — Perry + Currier Inc.

(57) ABSTRACT

The disclosure provides a system and method of authenticating a user to a network. For the method, if a request for a resource initiated by the device is related to a restricted resource, then the method: redirects the request to the authentication server; initiates an authentication process at the server to request a user account and a password from the device to authenticate the device if it has not been authenticated; automatically provides the device with access to the restricted resource if the device previously had been authenticated to access the restricted resource; and provides a signal to the device indicating whether it has been authenticated to allow the device to update its graphical user interface to indicate an access status for the restricted resource. If the request relates to a non-restricted resource, then the method automatically provides the device with access to the non-restricted resource.

19 Claims, 7 Drawing Sheets

(51) Int. Cl.
*G06F 21/40* (2013.01)
*G06F 21/31* (2013.01)
*G06F 21/30* (2013.01)
*H04W 12/00* (2009.01)
*G06F 21/33* (2013.01)
*G06F 21/35* (2013.01)

(52) U.S. Cl.
CPC ............... *G06F 21/35* (2013.01); *G06F 21/40* (2013.01); *H04L 63/08* (2013.01); *H04L 63/083* (2013.01); *H04W 12/00* (2013.01); *G06F 2221/2117* (2013.01); *G06F 2221/2149* (2013.01); *H04L 2463/082* (2013.01)

(56) References Cited

U.S. PATENT DOCUMENTS

| | | | |
|---|---|---|---|
| 6,836,287 B1 | 12/2004 | Nakahara | |
| 6,877,095 B1 | 4/2005 | Allen | |
| 7,058,817 B1 | 6/2006 | Ellmore | |
| 7,134,137 B2 * | 11/2006 | Joshi et al. | 726/1 |
| 7,373,515 B2 | 5/2008 | Owen et al. | |
| 7,640,574 B1 | 12/2009 | Kim et al. | |
| 7,676,829 B1 * | 3/2010 | Gui et al. | 726/5 |
| 2001/0037451 A1 | 11/2001 | Bhagavatula et al. | |
| 2002/0091745 A1 | 7/2002 | Ramamurthy et al. | |
| 2002/0157025 A1 | 10/2002 | Cragun et al. | |
| 2004/0133684 A1 | 7/2004 | Chan et al. | |
| 2004/0168049 A1 | 8/2004 | Lee | |
| 2004/0225880 A1 | 11/2004 | Mizrah | |
| 2005/0268107 A1 | 12/2005 | Harris et al. | |
| 2006/0021004 A1 * | 1/2006 | Moran et al. | 726/2 |
| 2006/0070125 A1 | 3/2006 | Pritchard et al. | |
| 2006/0136740 A1 | 6/2006 | Smith et al. | |
| 2007/0022301 A1 | 1/2007 | Nicholson et al. | |
| 2007/0033649 A1 | 2/2007 | Henriksen | |
| 2007/0277235 A1 * | 11/2007 | Barrett et al. | 726/12 |
| 2011/0167159 A1 | 7/2011 | Bethlehem et al. | |

OTHER PUBLICATIONS

Appenzeller et al. User-Friendly Access Control for Public Network Ports. IEEE. 1999.

* cited by examiner

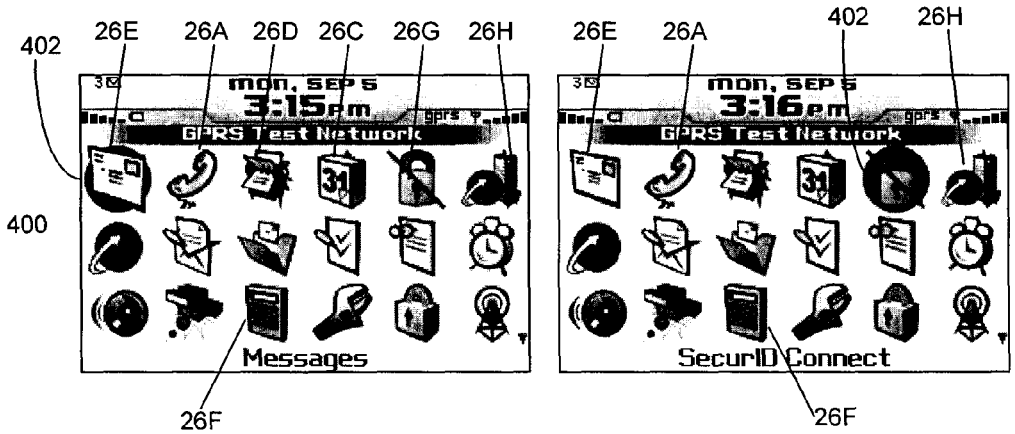
Fig. 5A(i) and Fig. 5A(ii)
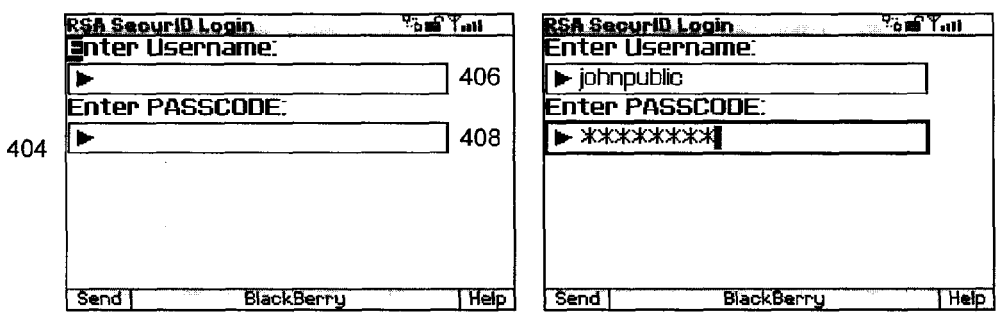
Fig. 5B(i) and Fig. 5B(ii)
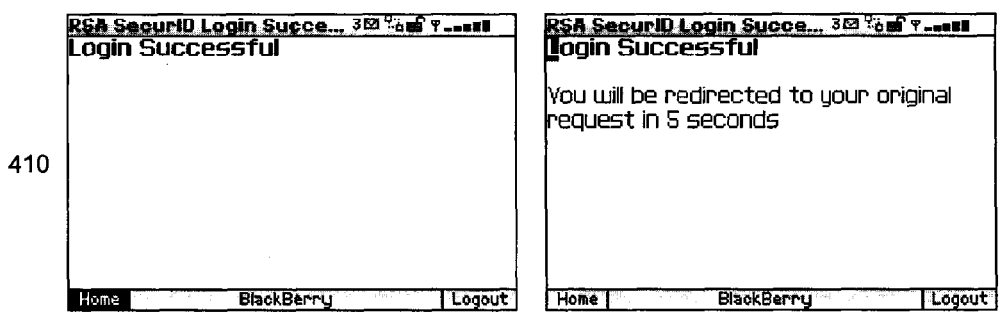
Fig. 5C      Fig. 5D

US 9,125,056 B2

SYSTEM AND METHOD FOR VALIDATING A USER OF AN ACCOUNT FOR A WIRELESS DEVICE

RELATED APPLICATION

This application is a continuation application of U.S. patent application Ser. No. 13/152,662 filed on Jun. 3, 2011, which itself is a continuation application of U.S. patent application Ser. No. 11/344,176 (now U.S. Pat. No. 7,975,287) filed on Feb. 1, 2006.

FIELD OF THE DISCLOSURE

This disclosure relates to the field of wireless communications, and more specifically, validating a user of an account when the user is accessing the account through a wireless device.

BACKGROUND

Current wireless mobile communication devices include microprocessors, memory, soundcards, and run one or more software applications. Examples of software applications used in these wireless devices include micro-browsers, address books, email clients, instant messaging ("IM") clients, and wavetable instruments. Additionally, wireless devices have access to a plurality of services via the Internet. A wireless device may be used to browse web sites on the Internet, to transmit and receive graphics and to execute streaming audio and/or video applications. The transfer of Internet content to and from wireless device is typically facilitated by the Wireless Application Protocol ("WAP"), which integrates the Internet and other networks with wireless network platforms.

Typically a network provides a series of accounts to users to allow those users controlled access to the resources maintained and controlled by the network (e.g. files, data, programs etc.). In a wired network, wired terminals are provided at physical ports connected to the network. This facilitates control over what can access the network, as the ports can be located within secure locations. However, when wireless devices are introduced into the network, the notion of a secure physical port does not apply to the wireless device. For example, if a wireless device that is connectable to the network is lost or stolen, then an unauthorized person who obtains the device may attempt to access the resources of the network. With respect to wireless device communications, it can be useful to provide authentication services for the user of the account. Prior art systems do provide some authentication systems and services for wireless devices.

There is a need for authentication systems for accounts when they are accessed through wireless devices. A need therefore exists for an effective method and system for providing such authentication.

BRIEF DESCRIPTION OF THE DRAWINGS

Further features and advantages of the embodiments of the present disclosure will become apparent from the following detailed description, taken in combination with the appended drawings, in which:

FIGS. 5A-5F are exemplary images produced on a display of the wireless device of FIG. 1 during access requests to services provided by the server of FIG. 1;

It will be noted that throughout the appended drawings, like features are identified by like reference numerals.

DETAILED DESCRIPTION OF EMBODIMENTS

Figure 1:
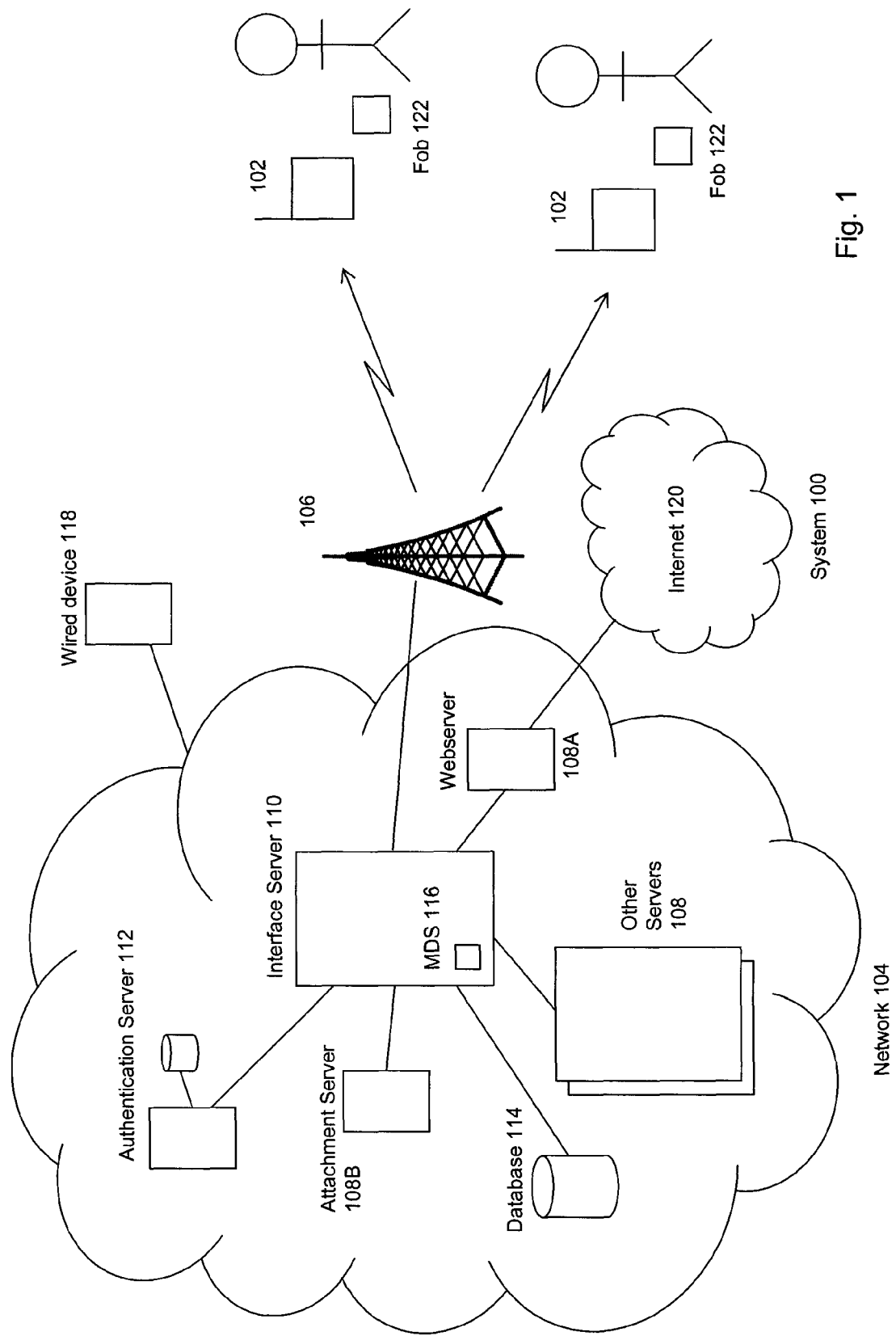
FIG. 1 is a schematic diagram of a communication system providing wireless communications between a wireless device and a network comprising an interface server and an authentication service, as provided in an embodiment.

The following detailed description of embodiments of the disclosure does not limit the implementation of the disclosure to any particular computer programming language. The disclosure may be implemented in any computer programming language provided that the operating system ("OS") provides the facilities that may support the requirements of the present disclosure. An embodiment is implemented in the JAVA™ computer programming language (or other computer programming languages such as C or C++). JAVA and all JAVA-based trademarks are the trademarks of Sun Microsystems Corporation. Any limitations presented would be a result of a particular type of operating system or computer programming language and would not be a limitation of the present disclosure.

In a first aspect, a method for controlling access of a wireless device to resources provided through a private network accessed by the wireless device from a first network is provided. The method comprises: receiving a request from the wireless device requesting access to a resource; evaluating whether the request for access to the resource is related to a restricted resource in the private network. If so, the method further comprises: intercepting the request and redirecting the request to an authentication server; if the wireless device has not been authenticated to access the restricted resource, then initiating an authentication process to request a user account and a password from the wireless device, the authentication process utilizing a two-factor authentication technique to authenticate the wireless device, processing an input stream provided from the wireless device in response to the authentication process, the input stream comprising account data and a password, comparing the input stream against valid account data associated with the restricted resource; and if the input stream matches the valid account data, authenticating access for the wireless device to the restricted resource and automatically directing the wireless device to the restricted resource in the private network; and if the wireless device previously had been authenticated to access the restricted resource, automatically providing the wireless device with access to the restricted resource. If the request for access to the resource relates to a non-restricted resource accessible from the first network, the method further comprises automatically providing the wireless device with access to the non-restricted resource.

In the method, the restricted resource may relate to a HTML page and is provided through an internet point-to-point protocol layer; the restricted resource may be provided in the Internet point-to-point protocol layer by the private network; the wireless device may have an access account to the first network; and the non-restricted resource may relate to a resource accessible from the first network.

In the method, the two-factor authentication technique may utilize a validation code provided to the wireless device from a user of the wireless device.

In the method, the validation code may be provided as part of the password.

The method may further comprise requesting the validation code from the user through the wireless device relating to the two-factor authentication technique when the input stream is not authenticated after a set number of authentication attempts.

In the method, the validation code may periodically change in a pattern known by the first network; and changes in the validation code are provided to the user.

In the method, access to the restricted resource may be time limited.

In the method, the authentication process may be executed on the authentication server.

In the method, the request may be generated after activation of a first icon in a graphical user interface (GUI) generated on a display of the wireless device, the GUI providing in one screen the first icon relating to a resource and a second icon relating to an authentication status of the wireless device.

In the method, the one screen may comprise a main application screen for the device.

In a second aspect, a server for controlling access of a wireless device to resources provided through a private network accessed by the wireless device from a first network is provided. The server comprises: a microprocessor; and a memory device. The memory device contains instructions for execution on the microprocessor to: receive a request from the wireless device requesting access to a resource; evaluate whether the request for access to the resource is related to a restricted resource in the private network and if so intercept the request and redirecting the request to an authentication process, if the wireless device has not been authenticated to access the restricted resource, then initiate the authentication process to request a user account and a password from the wireless device, the authentication process utilizing a two-factor authentication technique to authenticate the wireless device, process an input stream provided from the wireless device in response to the authentication process, the input stream comprising account data and a password, compare the input stream against valid account data associated with the restricted resource, and if the input stream matches the valid account data, authenticating access for the wireless device to the restricted resource and automatically directing the wireless device to the restricted resource in the private network. If the wireless device previously had been authenticated to access the restricted resource, the memory device contains further instructions for execution on the microprocessor to automatically provide the wireless device with access to the restricted resource. If the request for access to the resource relates to a non-restricted resource accessible from the first network, the memory device contains instructions for execution on the microprocessor to automatically provide the wireless device with access to the non-restricted resource.

In the server, the restricted resource may relate to a HTML page and is provided through an internet point-to-point protocol layer; the restricted resource may be provided in the internet point-to-point protocol layer by the private network; and the non-restricted resource may relate to a resource accessible from the first network.

In the server, the two-factor authentication technique may utilize a validation code provided from a user of the wireless device. Further, the validation code may be provided as part of the password.

In the server, the authentication process may further comprise requesting a validation code from the wireless device relating to the two-factor authentication technique when the wireless device has not been authenticated after a set number of authentication attempts.

In the server, the authentication process periodically may change the validation code in a pattern known and provides the changes in the validation code to the wireless device.

In the server, access to the restricted resource may be time limited.

In the server, the private network may include a mobile data services server.

In the server, the request from the wireless device may be generated after activation of a first icon in a GUI generated on a display of the wireless device, the GUI providing in one screen the first icon relating to a resource and a second icon relating to an authentication status of the wireless device.

In a third aspect, a non-transient computer readable medium is provided. The medium contains program instructions for causing a microprocessor to perform any of the aspects of the method described herein.

In a fourth aspect, another non-transient computer readable medium is provided. The medium contains program instructions for causing a microprocessor to perform the method of: receiving a request from a wireless device requesting access to a resource provided through a private network accessed by the wireless device from a first network; and evaluating whether the request for access to the resource is related to a restricted resource in the private network. If the request is so related, then the program instructions cause the microprocessor to perform the method of: intercepting the request and redirecting the request to an authentication server; if the wireless device has not been authenticated to access the restricted resource, then initiating an authentication process to request a user account and a password from the wireless device, the authentication process utilizing a two-factor authentication technique to authenticate the wireless device, processing an input stream provided from the wireless device in response to the authentication process, the input stream comprising account data and a password, comparing the input stream against valid account data associated with the restricted resource, and if the input stream matches the valid account data, authenticating access for the wireless device to the restricted resource and automatically directing the wireless device to the restricted resource in the private network; and if the wireless device previously had been authenticated to access the restricted resource, automatically providing the wireless device with access to the restricted resource. If the request is related to a non-restricted resource accessible from the first network, then the program instructions cause the microprocessor to perform the method of automatically providing the wireless device with access to the non-restricted resource.

The non-transient computer readable medium may contain further program instructions for causing the processor to perform the method of requesting the validation code from the user through the wireless device relating to the two-factor authentication technique when the input stream is not authenticated after a set number of authentication attempts.

For the non-transient computer readable medium, the microprocessor may be in a server in the private network; the restricted resource may relate to a HTML page and is provided through an internet point-to-point protocol layer; the restricted resource may be provided in the internet point-to-point protocol layer by the private network; the wireless device may have an access account to the first network; and the non-restricted resource may relate to a resource accessible from the first network.

For the non-transient computer readable medium, the request from the wireless device may be generated after activation of a first icon in a GUI generated on a display of the wireless device, the GUI providing in one screen the first icon relating to a resource and a second icon relating to an authentication status of the wireless device.

In another aspect, a method to control access for a wireless device that is authenticated to communicate via a first network to a restricted resource in a private network by an authentication server is provided. If a request for a resource initiated by the device is related to the restricted resource, then the method: redirects the request to the authentication server; initiates an authentication process at the authentication server utilizing a two-factor authentication technique to request a user account and a password from the device to authenticate the device if the device has not been authenticated to access the restricted resource; automatically provides the device with access to the restricted resource if the device previously had been authenticated to access the restricted resource; and provides a signal to the device indicating whether the device has been authenticated to access the restricted resource, the signal used by the device to update its graphical user interface (GUI) to indicate either a locked or unlocked access status for the restricted resource. If the request relates to a non-restricted resource accessible from the first network, then the method automatically provides the device with access to the non-restricted resource.

In a further aspect, an authentication process to control access for a wireless device that is authenticated to communicate with a first network to a restricted resource in a private network is provided. The authentication process comprises a redirection process, an access process and a signal process. The redirection process provides coded instructions to operate on a microprocessor in the first network. The redirection process is adapted to evaluate an access request initiated by the device to determine if the access request is related to the restricted resource. If the access request is related to the restricted resource, then the redirection process is adapted to: redirect the access request to the authentication server; initiate an authentication process utilizing a two-factor authentication technique to request a user account and a password from the device to authenticate the device if the device has not been authenticated to access the restricted resource; and automatically provide the device with access to the restricted resource if the device previously had been authenticated to access the restricted resource. The access process provides coded instructions to operate on the microprocessor and the access process adapted to automatically provide the wireless device with access to the non-restricted resource if the access request relates to a non-restricted resource accessible from the first network. The signal process providing coded instructions to operate on the microprocessor to provide a signal to the wireless device indicating whether the wireless device has been authenticated to access the restricted resource, the signal used by the wireless device to update its GUI to indicate either a locked or unlocked access status for the restricted resource.

According to another aspect of the disclosure, a method for authenticating accounts for users of wireless devices to accounts associated with a network in communication with the wireless device is provided. The method comprises: for an account associated with a user in the network, establishing an additional validation login step for use when the account is accessing a restricted service; when the user at the wireless device initiates a request for the restricted service, the network receives the request and automatically initiates the additional validation login step prior to providing the restricted service; processing an input stream from the device from the user in response to the validation login step to validate the request; and if the input stream is validated as being correct, providing the wireless device with access to the restricted service. In the method, the validation login step provides a two factor authentication process for accesses to the account from the wireless device.

In another aspect, a system for authenticating accounts for users of wireless devices to accounts associated with a network in communication with the wireless devices is provided. The system is provided in a network providing wireless access to services controlled by the network. The system comprises: a server to receive requests for services and to identify any request for a restricted service from a wireless device; an authentication system; an access server selectively providing the device with access to the restricted service if the input stream is validated correctly against the validation login step; and a server to control access of the device to the restricted service, once the input stream is correctly validated. The authentication system establishes parameters for an additional validation login step for a user making the any request for the restricted service from the wireless device in communication with the network; and receives and processes an input stream from the device from the user in response to the validation login step to validate the request. In the system, the validation login step provides part of a two factor authentication process for accesses to the account from the wireless device.

In yet another aspect, a method for authenticating a user of a device to a restricted resource provided through a network in communication with the device is provided. The method comprises: when the user at the device initiates a request for the restricted resource, the network receives the request and automatically initiates an authentication step relating to the user prior to providing the device access to the restricted resource, the authentication step including requesting a user account and a password; processing an input stream from the device from the user in response to the authentication step, the input stream comprising account data and a password; comparing the input stream against account data associated with the restricted resource; if the input stream matches the account data, providing the device with access to the restricted resource; and when the user at the device initiates a request for a non-restricted resource, providing the device with access to the non-restricted resource automatically.

In still yet another aspect, a system for authenticating a user of a device making a request to access a restricted resource provided in a network in communication with the device is provided. The system comprises: a process providing a non-restricted resource to the device automatically when the device requests the non-restricted resource; a second process controlling access to the restricted resource and initiating an authentication process for the user when the users initiates the request for the restricted resource; and an authentication process accessing data of accounts and passwords associated with the restricted resource, the authentication system evaluating user account and password data provided by the user in response to account data requested by the second process. The second process selectively provides the device with access to the restricted resource if the user account and password data matches records in the data of accounts and passwords.

In the system, the authentication process may utilize a two-factor authentication technique to authenticate the user; the device may be a wireless device that is associated with network account in the network; and the non-restricted resource may relate to a resource provided in the network.

In the system, status information for an authentication attempt may be provided to the device to allow the device to provide status information to the user.

In other aspects, various combinations of sets and subsets of the above noted aspects are provided.

FIG. 1 shows communication system 100 where network 104 provides a suite of applications, services and data through its associated servers. Wired devices 118 connect to network 104 through wired connections. Wireless devices 102 connect to network 104 through wireless network 106. Architectures of network 104 can be provided by known topologies. Wireless network 106 includes antenna, base stations and supporting radio transmission equipment known to those skilled in the art. Interface server 110 provides the main interface between network 104 and wireless network 106 to devices 102. Security systems within network 104 can be provided by known techniques and systems.

Network 104 provides a private network of secured data and resources and controls access to any restricted resources by its users. Access to restricted resources in network 104 is controlled using network accounts. For example, a user's network account can provide the user with access to his or her email account, data, files and programs managed through network 104. Typically, each account has a unique userID and a password associated with it. When the user needs to access his account, he initiates a login procedure where network 104 requests the userID and password information from the user. If the provided userID and password information verified, then the user is provided access to the account and its related resources. Accounts are accessed through devices connected to network 104, including wired terminals and devices connected through wired and wireless LANs. Network 104 maintains all network accounts and conducts all evaluations of signon requests. One example is an internal company network implemented as an Intranet. Specific resources can be provided for specific users, e.g. a company's internal vacation scheduling website, that preferably require a level of verification or authentication for the user accessing the resources. Exemplary network accounts include those provided on Microsoft Windows Server 2003 system (trade-mark), providing controlled access to email accounts and other network resources. In other embodiments, the network may provide a mix of private and public access to its resources.

Wired devices 118 preferably log onto network 104 using its network account signon procedures. In some architectures, a wired device 118 may not need to be authenticated through a network account and may be automatically provided with a limited set of non-restricted resources. For example, a user may access some resources deemed to be public by network 104 through a "guest" account.

When device 102 is connected to network 104, in one embodiment is does not utilize the login procedure used by wired devices 118 for network accounts. In other embodiments, device 102 may be processed through the same login procedure. In one embodiment, device 102 is automatically connected to network 104. In an embodiment, additional mechanisms, procedures and protocols are provided to provide a separate authentication login system for wireless device 102. Device 102 is operating in a separate wireless network controlled in part by wireless network 106. Interface server 110 provides a virtual private network connection between device 102 and network 104. As such, device 102 is connected to a network, i.e. the network provided by wireless network 106 that is operating independently of the private network 104. A network connection between interface server 110 and wireless device 102 is preferably made through an internal server in network 106 (not shown) that facilitates wireless device 102 to access the resources in network 104.

To assist in managing access of services to wireless devices 102, Mobile Data Services (MDS) server 116 is also provided in network 104. It communicates with devices 102 through interface server 110. MDS server 116 preferably forms a secure communication conduit between devices 102 and server 110 and can be seen as forming a VPN for wireless devices 102. MDS server 116 preferably provides access to a set of functions for wireless device 102, such as an HTTP and TCP/IP proxy with special features. In other embodiments multiple MDSes may be provided.

Web server 108A and attachment server 108B are connected to interface server 110 and collectively provided an interface for web page requests received from device 102. The web pages may be stored locally within network 104 or may be located elsewhere in Internet 120. Attachment server 108B provides processing of attachments sent between device 102 and network 104 relating to web access requests processed by web server 108A. The processing of attachments includes the modification of attachment files sent to and from device 102 to conform with any file handling requirements custom to the device 102 (e.g. changes to font sizes, reformat display proportions, etc.).

Authentication server 112 provides and manages user account authentications for devices 102 when they are accessing an MDS. Database 114 provides a storage facility for data used by MDS server 116.

Other servers 108 providing other services and processes for network 104 are provided as well.

Figure 2:
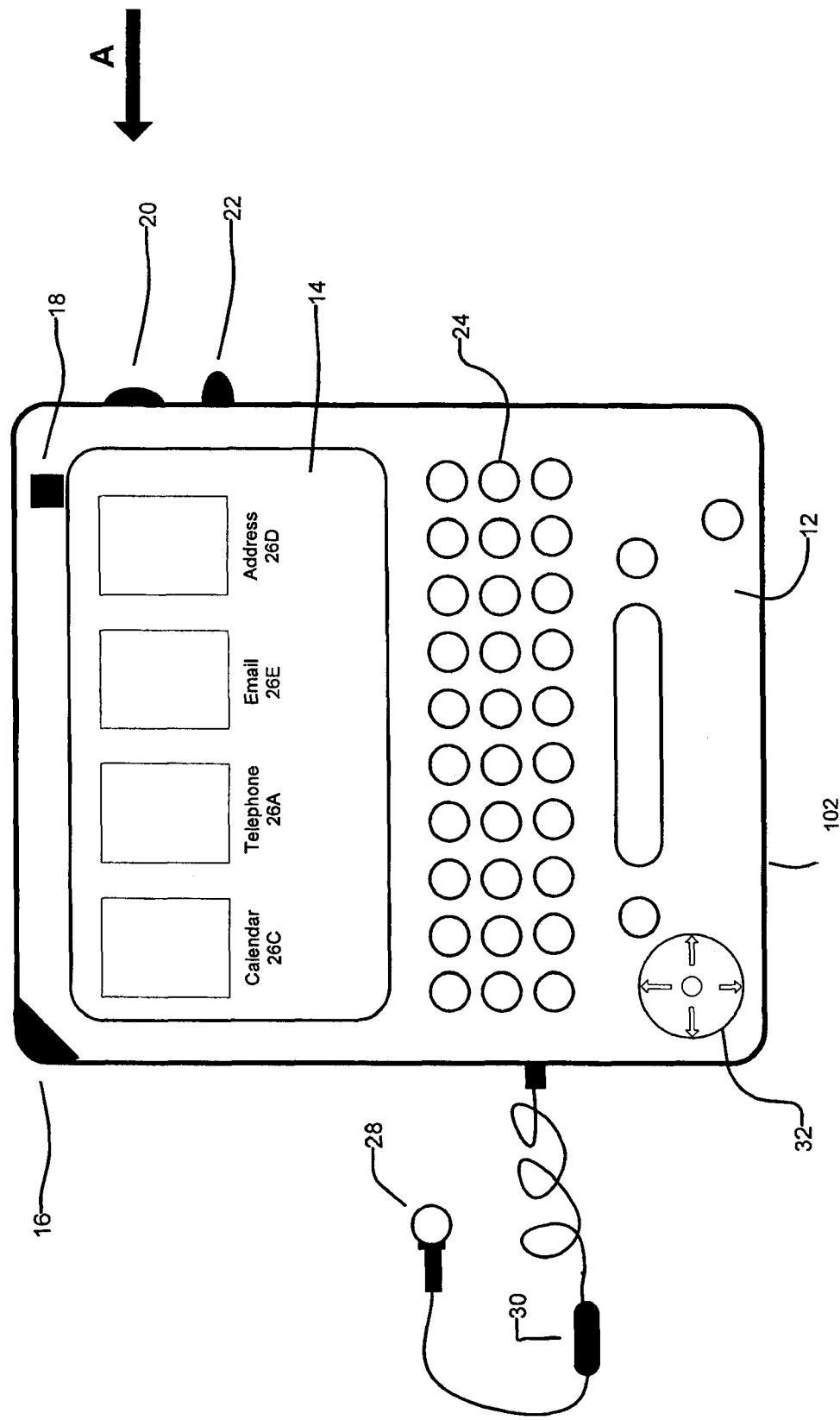
FIG. 2 is a schematic diagram of the wireless device of FIG. 1.

Referring to FIG. 2, further detail is provided on device 102 of FIG. 1. For an embodiment, electronic device 102 is based on a computing platform having functionality of an enhanced personal digital assistant with cellphone and e-mail features. It is, however, to be understood that device 102 can be based on construction, design and functions of other electronic devices, such as smart telephones, desktop computers pagers or laptops having telephony equipment. In a present embodiment, electronic device 102 includes a housing 12, which frames an LCD display 14, a speaker 16, an LED indicator 18, a trackwheel 20, an exit key 22, keypad 24 and a telephone headset comprised of an ear bud 28 and a microphone 30. Trackwheel 20 and exit key 22 can be inwardly depressed along the path of arrow "A" as a means to provide additional user-input. Keypad 24 is shown as a matrix of two rows of keys with each row having eight keys. Directional key 32 is a "rocker"-type key that has a center rest position and can be tilted or moved from its rest position in one of several directions (e.g. up, down, left or right, when viewing the front of device 10) to activate a programmed function associated with the direction of activation. A joystick or a rollerball input device can also be used instead or in addition to key 32.

Various applications are provided on device 102, including email, telephone, calendar and address book applications. A GUI to activate these applications is provided on display 14 through a series of icons 26. Shown are calendar icon 26C, telephone icon 26A, email icon 26E and address book icon 26D. Such applications can be selected and activated using the keypad 24 and/or the trackwheel 20. Further detail on selected applications is provided below.

It will be understood that housing 12 can be made from any suitable material as will occur to those of skill in the art. Device 102 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and many forms of 802.11 wireless broadband, like 802.11a, 802.11b, 802.11g, etc. that can support voice. Other embodiments include Voice over IP (VoIP) type streaming data communications that can simulate circuit switched phone calls. Ear bud 28 can be used to listen to phone calls and other sound messages and microphone 30 can be used to speak into and input sound messages to device 102.

Figure 3:
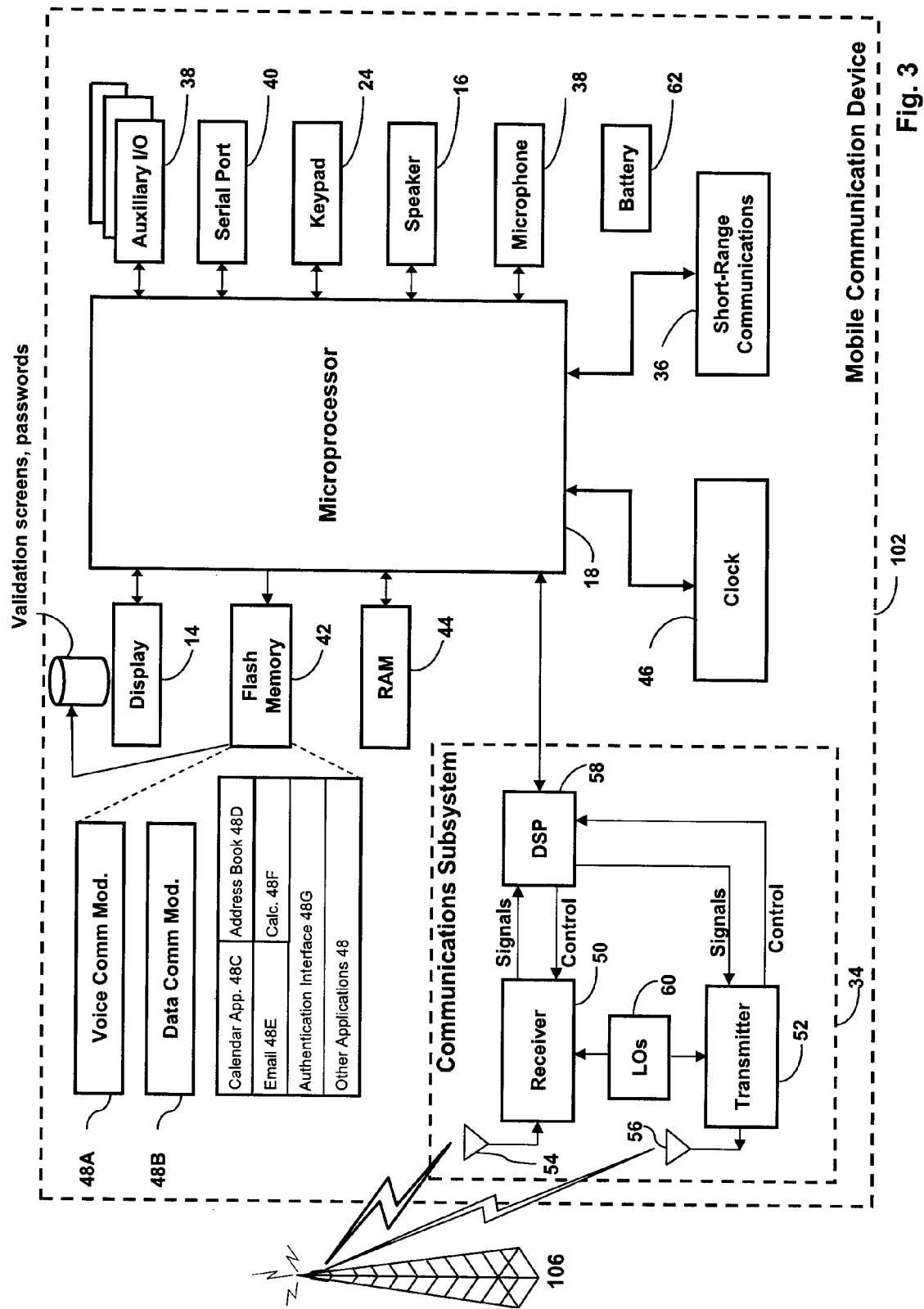
FIG. 3 is a block diagram of elements of the wireless device of FIG. 2.

Referring to FIG. 3, functional elements of device 102 are provided. The functional elements are generally electronic or electro-mechanical devices. In particular, microprocessor 18 is provided to control and receive almost all data, transmissions, inputs and outputs related to device 102. Microprocessor 18 is shown schematically as coupled to keypad 24, display 14 and other internal devices. Microprocessor 18 controls the operation of the display 14, as well as the overall operation of the device 102, in response to actuation of keys on the keypad 24 by a user. Exemplary microprocessors for microprocessor 18 include Data 950 (trade-mark) series microprocessors and the 6200 series microprocessors, all available from Intel Corporation.

In addition to the microprocessor 18, other internal devices of the device 102 include: a communication subsystem 34; a short-range communication subsystem 36; keypad 24; and display 14; with other input/output devices including a set of auxiliary I/O devices through port 38, a serial port 40, a speaker 16 and a microphone port 38 for microphone 30; as well as memory devices including a flash memory 42 (which provides persistent storage of data) and random access memory (RAM) 44; clock 46 and other device subsystems (not shown). The device 102 is preferably a two-way radio frequency (RF) communication device having voice and data communication capabilities. In addition, device 102 preferably has the capability to communicate with other computer systems via the Internet.

Operating system software executed by microprocessor 18 is preferably stored in a computer readable medium, such as flash memory 42, but may be stored in other types of memory devices, such as read only memory (ROM) or similar storage element. In addition, system software, specific device applications, or parts thereof, may be temporarily loaded into a volatile storage medium, such as RAM 44. Communication signals received by the mobile device may also be stored to RAM 44.

Microprocessor 18, in addition to its operating system functions, enables execution of software applications on device 102. A set of software applications 48 that control basic device operations, such as a voice communication module 48A and a data communication module 48B, may be installed on the device 102 during manufacture or downloaded thereafter.

Communication functions, including data and voice communications, are performed through the communication subsystem 34 and the short-range communication subsystem 36. Collectively, subsystem 34 and subsystem 36 provide the signal-level interface for all communication technologies processed by device 102. Various other applications 48 provide the operational controls to further process and log the communications. Communication subsystem 34 includes receiver 50, transmitter 52 and one or more antennas, illustrated as receive antenna 54 and transmit antenna 56. In addition, communication subsystem 34 also includes processing module, such as digital signal processor (DSP) 58 and local oscillators (LOs) 60. The specific design and implementation of communication subsystem 34 is dependent upon the communication network in which device 102 is intended to operate. For example, communication subsystem 34 of the device 102 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Communication subsystem 34 provides device 102 with the capability of communicating with other devices using various communication technologies, including instant messaging (IM) systems, text messaging (TM) systems and short message service (SMS) systems.

In addition to processing communication signals, DSP 58 provides control of receiver 50 and transmitter 52. For example, gains applied to communication signals in receiver 50 and transmitter 52 may be adaptively controlled through automatic gain control algorithms implemented in DSP 58.

In a data communication mode a received signal, such as a text message or web page download, is processed by the communication subsystem 34 and is provided as an input to microprocessor 18. The received signal is then further processed by microprocessor 18 which can then generate an output to the display 14 or to an auxiliary I/O port 40. A user may also compose data items, such as e-mail messages, using keypad 24, a thumbwheel associated with keypad 24, and/or some other auxiliary I/O device connected to port 40, such as a touchpad, a rocker key, a separate thumbwheel or some other input device. The composed data items may then be transmitted over communication network 106 via communication subsystem 34.

In a voice communication mode, overall operation of device 102 is substantially similar to the data communication mode, except that received signals are output to speaker 16, and signals for transmission are generated by microphone 30. Alternative voice or audio I/O subsystems, such as a voice message recording subsystem, may also be implemented on device 102.

Short-range communication subsystem 36 enables communication between device 102 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 62. Preferably, the power source 62 includes one or more batteries. More preferably, the power source 62 is a single battery pack, especially a rechargeable battery pack. A power switch (not shown) provides an "on/off" switch for device 102. Upon activation of the power switch an application 48 is initiated to turn on device 102. Upon deactivation of the power switch, an application 48 is initiated to turn off device 102. Power to device 102 may also be controlled by other devices and by internal software applications.

Additional applications include calendar 48C which tracks appointments and other status matters relating to the user and device 102. Calendar 48C is activated by activation of calendar icon 26C on display 14. It provides a daily/weekly/month electronic schedule of appointments, meetings and events entered by the user. Calendar 48C tracks time and day data for device 102 using processor 18 and internal clock 46. The schedule contains data relating to the current accessibility of the user. For example it can indicate when the user is busy, not busy, available or not available. In use, calendar 48C generates input screens on device 102 prompting the user to input scheduled events through keypad 24. Alternatively, notification for scheduled events could be received via an encoded signal in a received communication, such as an e-mail, SMS message or voicemail message. Once the data relating to the event is entered, calendar 48C stores processes information relating to the event; generates data relating to the event; and stores the data in memory in device 102.

Address book 48D enables device 102 to store contact information for persons and organizations. Address book 48D is activated by activation of address book icon 26D on display 14. In particular, name, address, telephone numbers, e-mail addresses, cellphone numbers and other contact information is stored. The data can be entered through keypad 24 and is stored in non-volatile memory, such as persistent storage 116 in device 102 in a database.

Email application 48E provides modules to allow user of device 102 to generate email messages on device 102 and send them to their addressees. Application 48E also provides a GUI which provides a historical list of emails received, drafted, saved and sent. Text for emails can be entered through keypad 24. Email application 48E is activated by activation of email icon 26E on display 14 and may use some or all of data communication module 48B.

Calculator application 48F provides modules to allow user of device 102 to create and process arithmetic calculations and display the results through a GUI.

Authentication application 48G provides modules to allow user of device 102 to initiate an authentication process that will allow user of device 102 to access logins screens for services that requires the user to authenticate himself prior to server 110 (FIG. 1) to granting him access to such restricted services. Further detail on this application is provided below in conjunction with other elements of an embodiment.

Referring back to FIG. 1, notable elements of an embodiment at network 104 are shown. In particular further detail is provided on a system and method for authenticating a user of wireless device 102 in network 104. As noted earlier, in some embodiments, wireless device 102 is provided with automatic access to a network account. This may be because the specific device 102 has been registered with the network management system of network 104. Additional device-centric security features may be provided on device 102 to control a user's ability to use device. For example a local password may be stored on device 102 and after a predetermined period of inactivity or after initially activating device 102, the device may require successful entry of the password before providing access to other features on device 102.

In addition to the local device-centric passwords for devices 102, a second account system is provided for devices 102. The second account system may be used separately or in conjunction with the network account password provided for wired devices 118. Managing the set of second accounts and managing access requests to the second accounts is provided through authentication server 112 and interface server 110. Once authentication of the user of a second account is achieved, then interface server 110 provides access to the user of the device 102 to some or all of the restricted services, files, data and programs associated with the second account. Such services and are preferably provided by modules implemented in server 110. MDS server 116 modules may be implemented in a layered architecture, in which one or more wireless applications 48 control the user's experience of the wireless device 102. It will be appreciated, that unless otherwise noted, the term "authentication" can be synonymously replaced with terms such as "validation", "verification" and others known to those skilled in the art.

In the embodiment, the network account and the second account are distinct accounts managed by distinct systems. It can be that for convenience, passwords and account names may be consistent between the two accounts, but this information is not necessarily shared between the systems. As such, in one embodiment, for a wireless device 102 is associated with a first user having a given network account, a second user having an account on the second account system can use the device to access his account on the second account system. In other embodiments, access to the accounts on the second account system may be tied to accounts on the network account system.

Turning now to further details on authentication server 112, details are provided a second account managed by the second account system. Management of the set of second accounts is provided by authentication server 112 through software that manages user account identification and verification. An exemplary authentication server is a RSA/Authentication manager server system (trade-mark) available from RSA Systems Inc.; in other embodiments, other authentication server(s) or system(s) may be used. An authentication manager server 112 manages signon requests and centrally administers signon policies for all second accounts for network 104. Server 112 may provide database replication and load balancing, automated LDAP import and synchronization and general platform support routines for the second accounts.

Important functions for maintenance of the second accounts are routines to establish and maintain them. This is done via account management routines and processes in authentication server 112. A new account for second account system may comprise an account name and a password. Again, the account name may differ from the name for the user's network account. The password may be a simple alphanumeric code. The account management routines provide facilities and screens allowing a user to change his and update his password for the second account. The accounts and passwords are stored, maintained and their use is verified by server 112.

In the embodiment, when device 102 initiates a request for access to a second account, a second authentication process is started. Therein, the request is received by interface server 110. In an embodiment, interface server 110 and MDS server 116 provide messages to device 102 and selectively grants access to restricted resources for users of the second accounts. Authentication server 112 is used to evaluate the login attempt and provide account status information servers 110 and 116.

As noted above, the second accounts are associated with a set of additional restricted resources, such as files, websites and Intranet sites. It will be appreciated that several network architectures can be provided to provide different levels of access to different resources to different accounts in the second account system. In one embodiment, there is no differentiation between accounts: when a second account is successfully activated, it has access to the same set of resources as other second accounts. Alternatively, different accounts may have access to different resources.

In the present embodiment, the restricted services for a second account are provided in an Internet point-to-point protocol (IPPP) layer. All resources, websites and other systems associated with that layer are preferably subject to authentication by the second account system when a user of device 102 attempts to access such services. The IPPP layer provides HTTP and TCP-like function to devices accessing the layer. Alternatively, other services may be offered through other layers, e.g. instant messaging and email services may be defined in a different layer. As such, these other services are automatically provided to the user of device 102 and the second account system is not engaged when such services are accessed through device 102.

A further feature of the second account system incorporates two-factor authentication. Two-factor authentication provides two levels of authentication based on something known by the user (e.g. an account) and something possessed by the user (e.g. a dynamic code). An exemplary two-factor authentication system is provided in a SecurID system (trademark) provided by RSA Security Inc. The SecurID system provides a fob 122 to the user of device 102. The fob has a display that shows a constantly changing validation code. When the user wishes to access a second account, the present code displayed on the device is submitted to the system with a userID for the second account. The authentication system has synchronized knowledge of what the present code on the fob should be. As such, if the submitted code matches the expected current code by the system, the user is deemed to be authenticated and is granted access to the restricted services related to the second account. In other embodiments, the validation code provided by the fob can be provided through software, a website, email or other transmissions to the user.

Utilities in MDS server 116 utilize an authentication interface utility, such as RSA Authentication Manage/Agent API 5.0. These interface utilities provide a standardized interface to server 112. As the API is C based, a native DLL is created to interface with the API. Software on MDS server 116 provides necessary links to authentication server 112 and provides required support to exchange information between it and server 112 and between it and device 102. In particular, MDS server 116 supports processing of authentication sessions when two-factor authentication techniques are used.

Further detail is provided on an authentication process using the second account system. When an user at wireless device 102 attempts to accesses restricted service controlled by a second account for the first time, if the user is accessing HTTP content, MDS server 116 automatically redirects the device 102 to login page controlled by the second account system. If the user is not accessing HTTP content (using the TCP handler for example), an exception is sent to device 102 indicating the failure. The MDS server 116 then generates a screen on device 102 that directs the user to a browser application generated on device 102 that will be used to process a login for the user to access the second account system.

Figure 4:
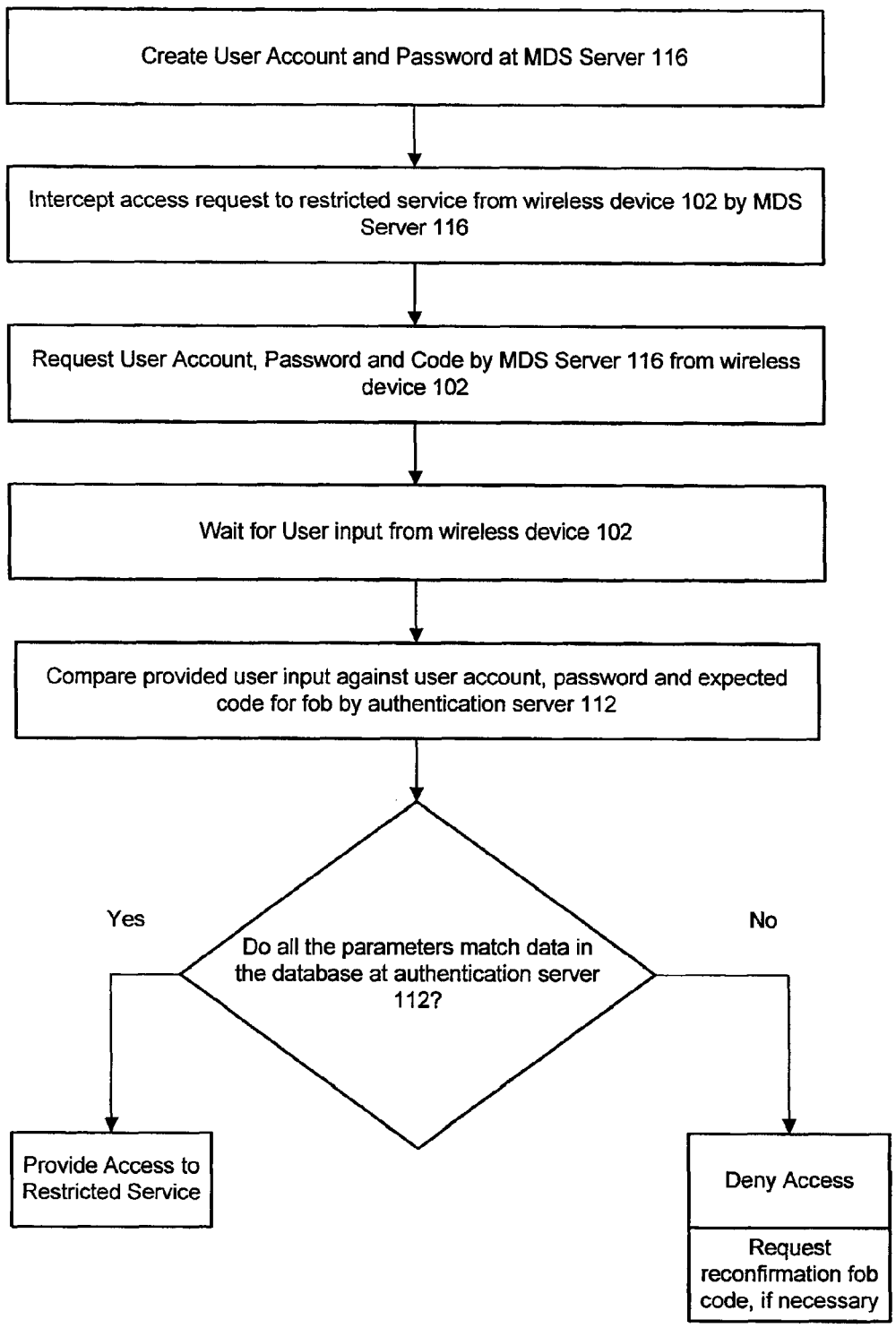
FIG. 4 is a flow chart of steps executed to authenticate a user through an embodiment of FIG. 1.

Referring to FIGS. 2, 4, 5A(i) and 5A(ii), details are provided on the steps conducted by an embodiment to authenticate a user of device 102 through the second account system. The authentication process provides a validation process for an input stream from the user. If the stream is validated as being correct, then access is provided. In the method, the validation login step incorporates a two factor authentication technique.

FIG. 5A(i) shows an exemplary GUI 400 generated on display 14 of device 102. As series of icons 26 are shown where each icon 26 represents a process, application or service which may be attempted to be accessed by device 102. Some of the applications are local processes stored on device 102 (e.g. calculator 48F). Some of the applications and processes are provided by server 110 (e.g. Intranet web access) to device 102. For resources that are controlled through the second account system, the second account system must authenticate the user before providing access to those restricted resources. Further detail on the authentication steps are provided below.

Preferably, GUI 400 provides authentication icon 26G to provide the user of device 102 a simple interface to access any restricted services. As such, if a user of device 102 has not recently been authenticated to access a restricted resource on server 110, he will not be able to access it until he has successfully authenticated himself to server 110 through device 102. For the present example, the restricted service is web access to an Intranet site. In FIG. 5A(i), on an initial access attempt, user can activate either authentication icon 26G by navigating cursor 402 to highlight the icon and then activating the appropriate select button on device 102. Other GUI techniques for navigating through icons and activating the underlying application can be implemented using known techniques.

Activation of icon 26G sends a message to server 110 that an authentication is being requested. For the current example, the user has not been authenticated. As such, the server 110 and authentication server 112 causes device 102 to initiate a login procedure for its user.

As shown in FIGS. 5B(i) and (ii), for the login procedure a signon screen 404 in generated on display 14 of device 102. Login screen has two dialog fields: field 406 for the username of the requested account and field 408 for the password associated with the account. The user of device 102 must enter the appropriate username and password assigned to him for the second account. The password preferably has two portions: a first portion, which is a PIN defined for the userID for the second account; and a second portion, which is the code relating to the two-factor identification system. The code can be provided by a fob carried by the user. Once the fields 406 and 408 are completed, users activates the sending of the information by activating a "carriage return" or "send" key on device 102. The username and password data is sent from device 102 to server 110. FIG. 5B(i) shows unpopulated fields and FIG. 5B(ii) shows fields populated by the user and sent to network 104.

Once server 110 receives the username and password data, they are automatically sent to authentication server 112 for evaluation. Both portions of the password must be checked. A database associated with authentication server 112 contains account name and password data associated with the second account. The authentication server also has a system to generate and check the provided validation code for a user against an expected validation code for a two-factor authentication system. The first portion of the password is checked against an account record for that userID. The second portion is checked against the expected code as tracked by authentication server 112. If one portion does not match, then the authentication process did not pass. In other embodiments, the order of the portions may be changed. If both portions match, then the user's account is authenticated and device 102 will be provided access to the restricted services. A signal is generated by authentication server 112 that the user has been authenticated and it is provided to device 102 through server 110. Device 102 receives this signal and optionally generates a confirmation GUI message on device 102, such as GUI 410 shown in FIG. 5C. If the data does not match, then the user has not been authenticated and no access is provided to the restricted services. An error message screen may be generated on device 102 and the user may be provided with a limited number of retry attempts.

Figure 5E:
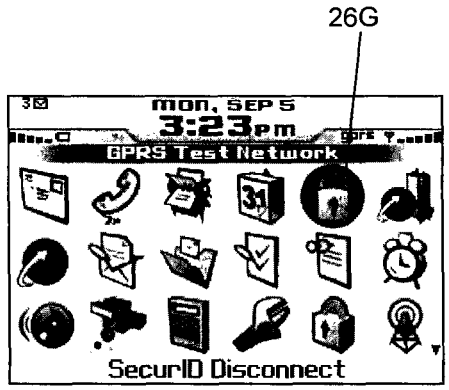

Referring to FIG. 5A(i), alternatively, if a user of device 102 has not yet been authenticated and attempts to access a restricted service directly (e.g. by activating web server icon 26H), upon the user activating icon 26H, device 102 sends a request to server 110 for the web service. Authentication server 112 provides success or fail messages for all password entries. As such, MDS server 116 intercepts this request and initiates generation of the signon screen as shown in FIGS. 5B(i) and 5B(ii). If the user successfully provides a correct set of username and password data (first and second portions), then application server allows access to the restricted service. A signal is generated by authentication server 112 that the user has been authenticated and it is provided to device 102 through server 110 as shown in FIG. 5D. Another signal may be generated the MDS server 116 to change the status of icon 26G to show that the session is "unlocked". Device 102 receives these signals and optionally generates a confirmation GUI message on device 102 that the user will be provided access to the restricted service, such as GUI 412 shown in FIG. 5E and changes the icon 26G to reflect the current "unlocked" state for the restricted services.

After the user has been authenticated, he has started a timed session for the restricted service. Once device 102 is authenticated, preferably device 102 is considered by the embodiment to be authenticated even if device 102 becomes controlled by a different user before the session ends. Access to the restricted service is ultimately controlled by the MDS server 116.

In other embodiments, further procedure(s) may be implemented to provide further steps to validate the user. For example, an additional login step may be required for access particularly sensitive internet resources managed by network 104, such as a payroll system. Control of these procedures may be handled by network 104, MDS server 116 or a combination of both, depending on the source of the requesting device.

The embodiment preferably provides two timeout mechanisms for the session. One mechanism is based on the elapsed time after logging in. A default time is set to 24 hours (as counted in minutes). A second mechanism is based on an elapsed time of inactivity on device 102. Inactivity may be tracked by monitoring relevant signals received from device 102 by the MDS server 116 (such as accessing an Intranet page). A default time is set to one hour (as counted in minutes). Tripping of either timing mechanism causes the MDS server 116 to terminate the session with device 104.

Other events that may cause the termination of a restricted session include the restarting of the MDS server 116. In such a scenario, preferably all devices 102 becomes unauthenticated and all users must login again.

Figure 5F:
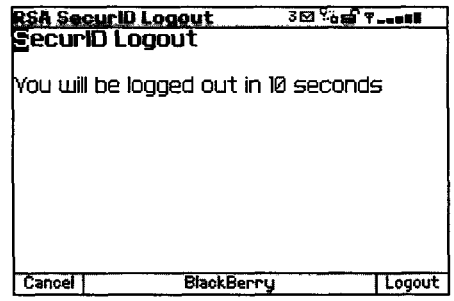

Alternatively still, the user of device 102 may manually terminate a session by activating session icon 26G. Activation of icon 26G when a session is active causes device 102 to send a termination signal to the MDS server 116. MDS server 116 receives the signal and authentication server 112 detects the signal and terminates the session. As the session was terminated by an active command from device 102, MDS server 116 preferably sends a confirmation message to device 102 and device 102 provides a status GUI message 414 on display 14, such as the message shown in FIG. 5F.

The above-noted processes for an active session continue until a session is terminated. Once a restricted session is terminated, a user can attempt to initiate a new session through the interfaces described earlier.

If the MDS server 116 is restarted in one embodiment, the "unlocked" icon for 26G on device 102 is not automatically removed. This would cause the user to believe that device 102 is still authenticated. In such an instance, the MDS server 116 pushes a "locked" icon to device 102 the next instance when the restricted browser is used and a page is requested by device 102. Server 116 may store a list of authenticated devices 102 in a persistent database (e.g. on a hard-drive or Flash RAM), and may access that list once server 116 is restarted to automatically provide access to those devices to their previously allowed resources.

In an embodiment, the restricted access icon 26G may not be provided on device 102 when it is initially provisioned. The icon 26G may be provided on the first instance that the restricted service is used.

In the embodiment as described, authentication server 112 is provided with the account ID and password for the second account by MDS server 116 and provides a "match" or "no match" response to MDS server 116. As such, the majority of the signon procedures are handled by MDS server 116. In other embodiment, authentication server 112 can provide more features, such as monitoring for the termination of a session. Therein, upon termination of a session, authentication server may terminate further access to the restricted service for device 102. Authentication server may also cause an appropriate message to be generated on device 102.

Further detail is provided on administrative aspects of accounts maintained by an embodiment.

Figure 6A:
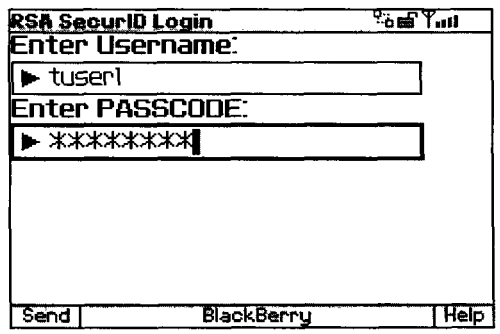
FIGS. 6A-6C are exemplary images produced on a display of the wireless device of FIG. 1 during an initialization of a user's account through the wireless device of FIG. 1.
Figure 6B:
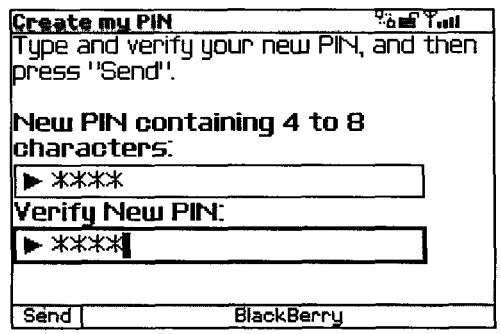
Figure 6C:
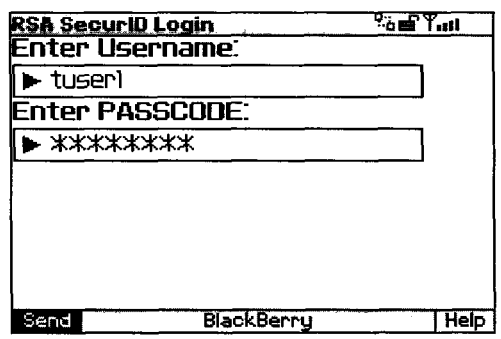

First, as noted, earlier, a separate userID account is created in the second account system. When a user is assigned a SecurID token for the first time, it is necessary to create a PIN for the account. The PIN represents the first portion of the password in a two-factor authentication system. The PIN may be generated automatically by the authentication server 112 or the user may generate the PIN. PIN creation screens in FIGS. 6A-6C are generated on device 102 through messages that are sent between device 102 and authentication server 112 during the creation and verification of the PIN. The PIN provides the first portion of the password used to authenticate the user.

The embodiment describes having a two-factor authentication system used by authentication system 112. In a two-factor authentication system 112 provided by RSA Systems, Inc. a hardware or software fob is provided to the user of device 102. Typically, the fob has a constantly changing token value that is known and synchronized with the authentication system. As such, to complete the two-factor authentication, the system asks the user to enter the current value of the token. If the user has the fob and the current token, he is deemed to satisfy the second factor of the login process. In other embodiments, a software fob may be provided to a device. In other embodiments, the fob is not used at all and the password comprises only the first portion of data.

For the embodiment, entry of the token is not necessarily provided when a user of device 102 accesses a restricted service. However in other embodiments, another level of signon can be provided where the user is presented with a token screen and is required to enter the correct token from the fob. Failure to provide the correct token will result in no access provided to the restricted services.

Figure 7A:
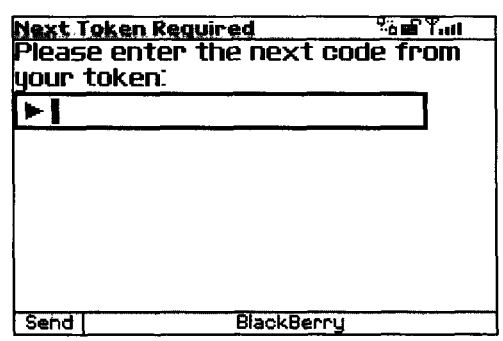
FIGS. 7A-7B are exemplary images produced on a display of the wireless device of FIG. 1 during a reconfirmation of a user's account through the wireless device of FIG. 1.
Figure 7B:
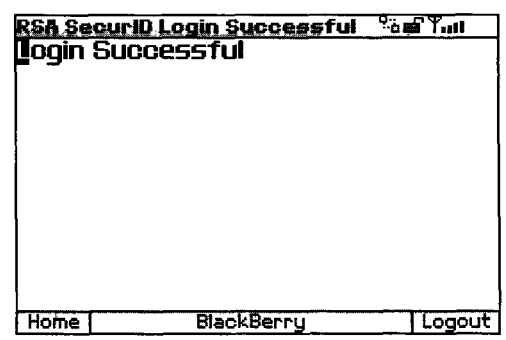

However, as a further feature, if the user had unsuccessfully completed the initial signon screens as noted earlier for FIGS. 7A and 7B, then an embodiment can require that the user provide one or more successive tokens from the fob in order to provide another level of authentication for the user. By requesting two successive tokens from the user, a further level of confidence in the authentication of the user is achieved. During the entry of the second token, screen shown in FIG. 7B may be provided again to device 102.

The embodiments of the disclosure described above are intended to be exemplary only. The scope of the disclosure is therefore intended to be limited solely by the scope of the appended claims.

The invention claimed is:

1. A method for controlling access of a wireless device to resources provided through a private network accessed by the wireless device from a first network, the method comprising:
receiving, at a server, a request from the wireless device requesting access to a resource, the request being received upon activation of a first icon in a graphical user interface (GUI) on a display of the wireless device, the first icon relating to the resource and the GUI providing in one screen the first icon and a second icon relating to an authentication status of the wireless device;
in response to determining, at the server, that the request for access to the resource is related to a restricted resource in the private network;
intercepting the request, at the server, and redirecting the request to an authentication server;
in response to receiving, from the authentication server, a signal indicating that the wireless device has not been authenticated to access the restricted resource:
initiating, at the server, an authentication process to request a user account and a password from the wireless device, the authentication process utilizing a two-factor authentication technique to authenticate the wireless device, the two-factor authentication technique comprising:
processing, at the server, an input stream provided from the wireless device in response to the authentication process, the input stream comprising account data and a password;
sending the input stream to the authentication server for comparison against valid account data associated with the restricted resource; and
in response to receiving, at the server, a response from the authentication server that the input stream matches the valid account data:
authenticating access for the wireless device to the restricted resource;
automatically directing the wireless device to the restricted resource in the private network; and
providing a message to the wireless device, the message causing the wireless device to update the one screen provided by the GUI to indicate through the second icon that the wireless device has been authenticated to access the restricted resource; and
in response to determining, at the server, that the wireless device previously had been authenticated to access the restricted resource, automatically providing the wireless device access to the restricted resource; and
in response to determining, at the server, that the request for access to the resource relates to a non-restricted resource accessible from the first network, automatically providing the wireless device access to the non-restricted resource.

2. The method for controlling access of a wireless device to resources as claimed in claim 1, wherein:
the restricted resource relates to a HTML page and is provided through an internet point-to-point protocol layer;
the restricted resource is provided in the internet point-to-point protocol layer by the private network;
the wireless device has an access account to the first network; and
the non-restricted resource relates to a resource accessible from the first network.

3. The method for controlling access of a wireless device to resources as claimed in claim 1, wherein the two-factor authentication technique comprises receiving a validation code from the wireless device, and wherein, at the server, a response from the authentication server comprises receiving the response when the validation codes matches an validation code generated by the authentication server.

4. The method for controlling access of a wireless device to resources as claimed in claim 3, wherein the validation code is provided as part of the password.

5. The method for controlling access of a wireless device to resources as claimed in claim 4, further comprising requesting the validation code from the wireless device when the input stream is not authenticated after a set number of authentication attempts.

6. The method for controlling access of a wireless device to resources as claimed in claim 5, wherein the validation code periodically changes in a pattern known by the first network; and changes in the validation code are provided to the wireless device.

7. The method for controlling access of a wireless device to resources as claimed in claim 1, wherein access to the restricted resource is time limited.

8. The method for controlling access of a wireless device to resources as claimed in claim 1, wherein the one screen comprises a main application screen for the wireless device.

9. A server for controlling access of a wireless device to resources provided through a private network accessed by the wireless device from a first network, the server comprising:
a microprocessor;
a memory device containing instructions executable by the microprocessor to
receive a request from the wireless device requesting access to a resource, the request being received upon activation of a first icon in a graphical user interface (GUI) on a display of the wireless device, the first icon relating to the resource and the GUI providing in one screen the first icon and a second icon relating to an authentication status of the wireless device;
in response to determining that the request for access to the resource is related to a restricted resource in the private network;
intercept the request and redirecting the request to an authentication process;
in response to receiving, from the authentication server, a signal indicating that the wireless device has not been authenticated to access the restricted resource
initiate the authentication process to request a user account and a password from the wireless device, the authentication process utilizing a two-factor authentication technique to authenticate the wireless device, the two-factor authentication technique comprising:
process an input stream provided from the wireless device in response to the authentication process, the input stream comprising account data and a password;
sending the input stream to the authentication server for comparison against valid account data associated with the restricted resource;
in response to receiving a response from the authentication server that the input stream matches the valid account data;
authenticating access for the wireless device to the restricted resource;
automatically directing the wireless device to the restricted resource in the private network;

providing a message to the wireless device, the message causing the wireless device to update the one screen provided by the GUI to indicate through the second icon to indicate that the wireless device has been authenticated to access the restricted resource; and in response to determining that the wireless device previously had been authenticated to access the restricted resource, automatically provide the wireless device with access to the restricted resource; and in response to determining that the request for access to the resource relates to a non-restricted resource accessible from the first network, automatically provide the wireless device with access to the non-restricted resource.

10. The server as claimed in claim 9, wherein:
the restricted resource relates to a HTML page and is provided through an internet point-to-point protocol layer;
the restricted resource is provided in the internet point-to-point protocol layer by the private network; and
the non-restricted resource relates to a resource accessible from the first network.

11. The server as claimed in claim 9, wherein:
the two-factor authentication technique further comprises receiving a validation code from the wireless device; and
the validation code is provided as part of the password.

12. The server as claimed in claim 9, wherein the two-factor authentication technique further comprises requesting a validation code from the wireless device when the wireless device has not been authenticated after a set number of authentication attempts.

13. The server as claimed in claim 9, wherein:
the private network includes a mobile data services server; and
the server is a redirection server.

14. A non-transitory computer readable medium storing computer readable instructions executable by a microprocessor to:
receive a request from a wireless device requesting access to a resource provided through a private network accessed by the wireless device from a first network request being received upon activation of a first icon in a graphical user interface (GUI) on a display of the wireless device, the first icon relating to the resource and the GUI providing in one screen the first icon and a second icon relating to an authentication status of the wireless device;
in response to determining that the request for access to the resource is related to a restricted resource in the private network;
intercept the request and redirecting the request to an authentication server;
in response to receiving, from the authentication server, a signal indicating that the wireless device has not been authenticated to access the restricted resource, initiate an authentication process to request a user account and a password from the wireless device, the authentication process utilizing a two-factor authentication technique to authenticate the wireless device, the two-factor authentication technique comprising:

processing an input stream provided from the wireless device in response to the authentication process, the input stream comprising account data and a password;
sending the input stream to the authentication server for comparison against valid account data associated with the restricted resource; and
in response to receiving a response from the authentication server that the input stream matches the valid account data;
authenticating access for the wireless device to the restricted resource;
automatically directing the wireless device to the restricted resource in the private network; and
providing a message to the wireless device, the message causing the wireless device to update the one screen provided by the GUI to indicate through the second icon of the GUI to indicate that the wireless device has been authenticated status to access the restricted resource;
in response to determining, at the server, that the wireless device previously had been authenticated to access the restricted resource, automatically provide the wireless device access to the restricted resource; and
in response to determining, at the server, that the request for access to the resource relates to a non-restricted resource accessible from the first network, automatically provide the wireless device access to the non-restricted resource.

15. The non-transitory computer readable medium as claimed in claim 14, wherein the two-factor authentication technique further comprises
requesting the validation code from the wireless device when the input stream is not authenticated after a set number of authentication attempts.

16. The non-transitory computer readable medium as claimed in claim 14, wherein:
the microprocessor is in a server in the private network;
the restricted resource relates to a HTML page and is provided through an internet point-to-point protocol layer;
the restricted resource is provided in the internet point-to-point protocol layer by the private network;
the wireless device has an access account to the first network; and
the non-restricted resource relates to a resource accessible from the first network.

17. The non-transitory computer readable medium as claimed in claim 14, wherein:
when the second icon is activated and the wireless device is not authenticated by the authentication server, the authentication process is initiated.

18. The method for controlling access of a wireless device to resources as claimed in claim 1, wherein:
when the second icon is activated and the wireless device is not authenticated by the authentication server, the authentication process is initiated.

19. The server as claimed in claim 9, wherein:
when the second icon is activated and the wireless device is not authenticated by the server, the authentication process is initiated.

* * * * *